May 14, 1935. A. M. FISHER 2,001,018
MEANS FOR CONVEYING MESSAGES
Filed May 5, 1934
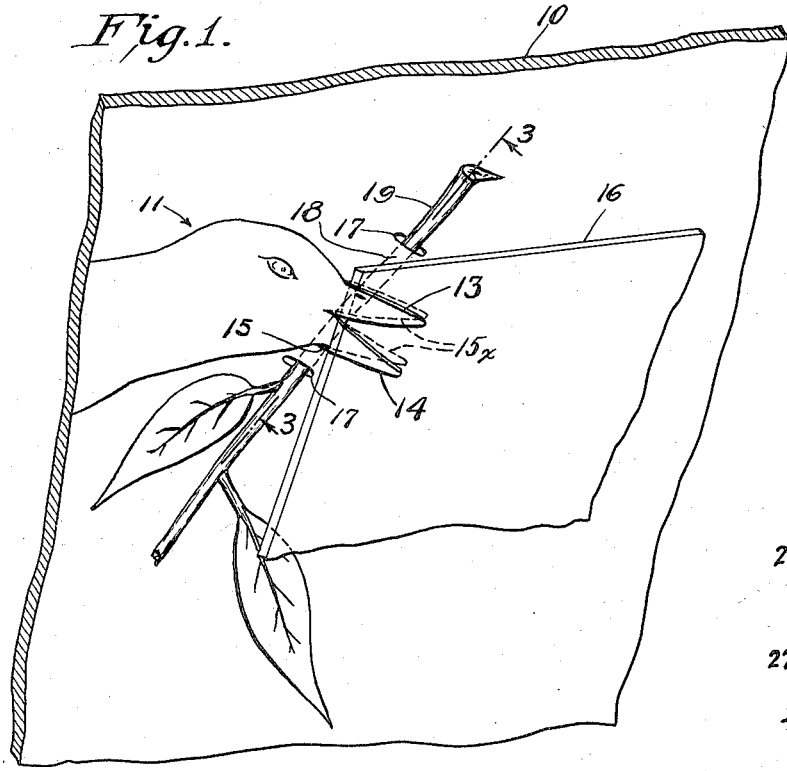
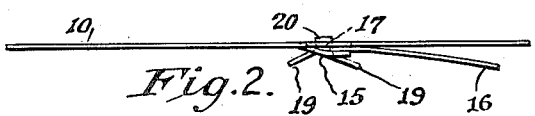
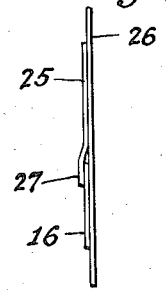
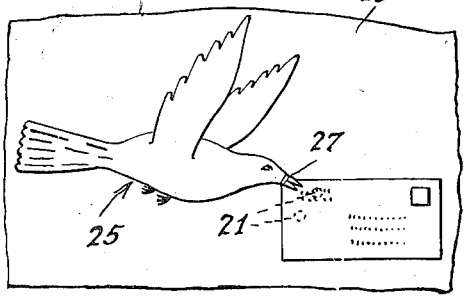
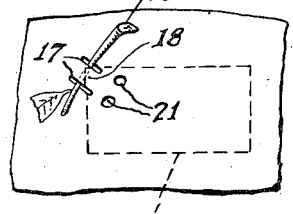
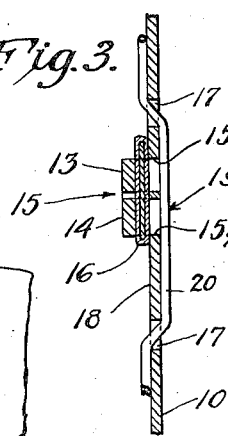
INVENTOR.
Ann M. Fisher
BY Robt. D. Pearson
ATTORNEY.

Patented May 14, 1935

2,001,018

UNITED STATES PATENT OFFICE 2,001,018

MEANS FOR CONVEYING MESSAGES

Ann M. Fisher, Los Angeles, Calif.

Application May 5, 1934, Serial No. 724,139

2 Claims. (Cl. 40—158)

This invention relates to means for supporting, in an attractive and artistic manner, various objects, more particularly small articles of an ornamental or sentimental character.

An object of the invention is to provide an efficient means for supporting a plurality of desired articles in combination with an image or pictorial representation of a bird or other animal, said articles being supported in such a manner that it appears that the animal pictured is holding them.

The invention is not restricted in its scope to the pictorial representation of any particular animal, nor to the support of the particular objects shown in the drawing, but the invention may be embodied by various other means without exceeding its scope as defined by the claims.

Another object of the invention is to provide a simplified and more secure means to support an ornamental, sentimental or other article so that it will be more safely and accurately sustained in the proper relation to the image or picture of the animal which it is preferred to represent.

Other objects, advantages and features of the invention may hereinafter appear.

Referring to the accompanying drawing, which illustrates what is at present deemed to be a preferred embodiment of the invention, Fig. 1 is a face view of a supporting plate having thereon a picture of a bird, the bird being represented as carrying in its mouth the olive branch and envelope which are attached to the plate.

Fig. 2 is a top view of Fig. 1.

Fig. 3 is a sectional view taken on line 3—3 of Fig. 1.

Fig. 4 is a view of a fragment of the plate showing in greater detail how the branch or article substituted therefor is attached to the plate, the position of the branch being indicated in full lines. Representation of the bird is omitted from this view in order that the branch holding slits may not be obscured.

Fig. 5 is a side view wherein the bird is shown stamped or cut out of a separate plate which is attached flatwise to the main plate.

Fig. 6 is an end view of Fig. 5.

Describing first the structures shown in Figs. 1, 2 and 3, the metallic, cardboard, or other plate 10 has thereon a picture 11 of a bird which is shown in flight in Fig. 5. Cut slits 13 and 14 are made through the plate at each side of the portion of the picture representing the bill of the bird, these cuts cooperating and thus forming a deflectable tongue 15 (see Fig. 2). This tongue is disposed at an acute angle to the face of the plate, and behind it is wedged the corner or edge portion of the card or envelope 16 which is supposed to contain a message or for example, a valentine to be delivered by the bird. The tongue 15, which forms the bill, has in its free end a V-shaped notch 15 representing the bird's mouth. If desired, a little glue or other adhesive material may be applied between the back surface of the tongue 15 and the adjoining surface of the envelope 16 in order to hold the envelope more securely.

Near the opposite sides of the tongue 15 the main plate is shown slitted at 17 in such a manner as to form the retaining loop 18 therebetween whereby the olive branch 19 is also supported in such a manner as to appear to be carried in the bird's mouth along with the message-bearing envelope. This arrangement suggests that a message of peace or of good will is inclosed within the envelope. As illustrated at 20 in Fig. 3, the branch or sprig shown is provided with a somewhat deflected portion in order that it may pass behind the portion of the card which represents the bill of the bird. It is to be understood, however, that in the drawing the amount of deflection has been greatly exaggerated in order to afford clearness of illustration.

In Figs. 5 and 6 is shown a modification wherein the bird 25 is cut out separately and is pasted or otherwise secured to the supporting plate 26, the bird's bill 27 being deflected slightly away from the face of the plate to provide room between the bill and plate for the edge or corner portion of the envelope, the latter being held in place in a manner similar to that already described in connection with Figs. 1 and 2. Both forms of the invention show an image of a bird and also show juxtaposed to the mouth or beak of the bird, the objects it is supposed to transport.

When a dove and olive branch are associated with each other the two objects harmonize, both of them being symbolical of peace and harmony and suggesting that the message of that character is contained in the envelope, or message.

The invention is of sufficient scope to include, in a general way, means to sustain an image of the animal kingdom and an object in such relation to each other that said individual appears to be sustaining said object by other means than in the mouth, such for example, as an eagle or other bird grasping an object in its talons, a man grasping something with his hands, etc.

The spots of glue 21 are placed between the plate 10 and envelope 16 to hold same together at points beyond the image 11. These glue spots, outside of the picture of the bird, cooperate with the tongue 15 representing the bird's bill to fasten the envelope in place.

I claim:

1. A sheet-like support bearing the representation of an animal, a tongue stuck-out from the support forming the representation of the mouth of the animal, a plate-like member simulating a mailed message having its edge inserted under said tongue, slits formed in the support adjacent the tongue, a twig passed through the slits in such manner that the mouth of the animal appears to hold the twig as well as the message.

2. A sheet-like support bearing the representation of an animal, a tongue extending from the surface of the support and representing the mouth of the animal, a plate-like member simulating a mailed message having its edge inserted under the tongue and secured to the support, slits formed in the support adjacent the tongue in such a position that a twig passed through them appears to be held by the mouth of the animal together with the message.

ANN M. FISHER.